(12) United States Patent
Seo et al.

(10) Patent No.: US 11,264,862 B2
(45) Date of Patent: Mar. 1, 2022

(54) TERMINAL DEVICE FOR DRIVE MOTOR OF VEHICLE

(71) Applicant: Hyundai Mobis Co., Ltd., Seoul (KR)

(72) Inventors: Yeong Woo Seo, Busan (KR); Jong Bin Park, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 276 days.

(21) Appl. No.: 16/531,578

(22) Filed: Aug. 5, 2019

(65) Prior Publication Data

US 2020/0052546 A1 Feb. 13, 2020

(30) Foreign Application Priority Data

Aug. 7, 2018 (KR) .......................... 10-2018-0091632

(51) Int. Cl.
*H02K 5/22* (2006.01)
*H02K 1/12* (2006.01)
*H01R 39/02* (2006.01)
*H02K 3/04* (2006.01)

(52) U.S. Cl.
CPC ............. *H02K 5/225* (2013.01); *H01R 39/02* (2013.01); *H02K 1/12* (2013.01); *H02K 3/04* (2013.01)

(58) Field of Classification Search
CPC ............ H02K 5/225; H02K 1/12; H02K 3/04; H02K 2203/09; H02K 3/522; H01R 39/02; H01R 39/027
USPC .......................................................... 310/71
See application file for complete search history.

(56) References Cited

U.S. PATENT DOCUMENTS

| 8,373,321 | B2 | 2/2013 | Lee et al. | |
|---|---|---|---|---|
| 10,008,900 | B2* | 6/2018 | Bessho | H02K 1/12 |
| 2011/0215662 | A1 | 9/2011 | Lee et al. | |
| 2013/0009495 | A1* | 1/2013 | Ueno | H02K 3/44 |
| | | | | 310/43 |
| 2016/0010265 | A1* | 1/2016 | Jang | D06F 37/30 |
| | | | | 310/71 |
| 2016/0079822 | A1* | 3/2016 | Noguchi | F04D 13/06 |
| | | | | 310/71 |
| 2016/0149447 | A1* | 5/2016 | Jang | H02K 1/187 |
| | | | | 310/71 |
| 2018/0083516 | A1* | 3/2018 | Endo | H02K 15/0043 |
| 2018/0233984 | A1* | 8/2018 | Ogawa | H02K 3/522 |
| 2020/0052546 | A1* | 2/2020 | Seo | H01R 39/02 |

FOREIGN PATENT DOCUMENTS

| KR | 10-2011-0101333 | 9/2011 |
|---|---|---|
| KR | 10-2019-0024128 | 3/2019 |

* cited by examiner

*Primary Examiner* — John K Kim
(74) *Attorney, Agent, or Firm* — H.C. Park & Associates, PLC (57) ABSTRACT

The present invention relates to a terminal device for a drive motor of a vehicle. The terminal device includes: a core bobbin assembly having a core mounted in a circumferential direction, the core having a coil wound therearound; a support ring for supporting an outer part of the core bobbin assembly; and a terminal assembly for being fitted with the support ring. The terminal for constituting the terminal assembly is provided with a resin injection hole formed vertically along an inner circumference thereof, and the resin injection hole are injected with a synthetic resin for holding the terminal assembly and the core bobbin assembly together.

9 Claims, 11 Drawing Sheets

TERMINAL DEVICE FOR DRIVE MOTOR OF VEHICLE

CROSS-REFERENCE TO RELATED APPLICATION

This application claims priority from and the benefit of Korean Patent Application No. 10-2018-0091632, filed on Aug. 7, 2018, which is hereby incorporated by reference for all purposes as if set forth herein.

BACKGROUND

Field

Exemplary embodiments relate to a terminal device for a drive motor of a vehicle. In particular, the present invention relates to a terminal device for a drive motor of a vehicle that can achieve cost reduction and durability by changing the structure of a terminal assembly of a drive motor.

Discussion of the Background

In general, the stator windings of a drive motor for a hybrid car constitute a circuit through a terminal assembly.

The stator of a drive motor for a hybrid car has a concentrated winding structure, and in order to bind the coils in the concentrated windings, a three-phase circuit is constructed through a terminal assembly.

Next, a connection procedure of a stator and a terminal assembly for forming a three-phase circuit is as follows:

First, after winding coils around core bobbin assemblies, coil drawing-in-and-out and forming is necessary (i.e., a process for locating coils in the fusing section of a terminal assembly). Next, twenty-four core bobbin assemblies wound with coils are arranged in a circle. Then, a support ring is used to press-fit the core bobbin assemblies.

Thereafter, a terminal assembly is fitted into the support ring and the twenty-four core bobbin assemblies. Subsequently, the formed coils and the hook section of the terminal are fused to construct a three-phase circuit. Finally, an epoxy resin is used to carry out full potting for the fused hook section.

However, in the case of connecting a prior art stator and terminal assembly, when a terminal, stator, and housing are fastened using a flange and bolts, the outer periphery may sufficiently be supported but the holding strength is weak at the connecting part between the coils and the fusing section at the inner periphery. Hence, there is a problem that during a random vibration and shock test, the stator and the terminal assembly vibrate separately, so that the hook section and the formed coils which are the connecting part at the inner periphery are under constant vibration and shock, thereby resulting in the breakage of coils.

Moreover, in the prior art stator and terminal assembly, there is a problem that additional work is required for carrying out a potting process on connecting coils to improve the holding strength between the stator and the terminal assembly.

The above information disclosed in this Background section is only for enhancement of understanding of the background of the invention and, therefore, it may contain information that does not constitute prior art.

SUMMARY

Exemplary embodiments of the present invention is designed to solve prior art problems as described above, and therefore, it is an object to provide a terminal device for a drive motor of a vehicle that can achieve cost reduction and durability as well as easy connection by changing the structure of a terminal assembly and a core bobbin assembly.

A terminal device for a drive motor of a vehicle according to an embodiment of the present invention comprises: a core bobbin assembly having cores mounted in a circumferential direction, the cores having coils wound therearound; a support ring for supporting an outer part of the core bobbin assembly; and a terminal assembly for being fitted onto the support ring and for fixing locking members. Here, a terminal constituting the terminal assembly is provided with a plurality of resin injection holes formed vertically and spaced apart from each other along an inner circumference thereof, and the resin injection holes are injected with a synthetic resin for holding the terminal assembly and the core bobbin assembly together.

Further, the terminal assembly is provided with inward extensions spaced apart from each other in a predetermined interval on an inner face thereof, and each of the resin injection holes may be formed inside each of the inward extensions.

Moreover, the terminal for constituting the terminal assembly may be formed by combining a plurality of terminal members formed in a shape of an annulus.

In addition, a bottom of the terminal of the terminal assembly in which the resin injection holes are formed may be provided with resin flow passages to an outward direction.

Here, the resin flow passages may get wider to the outward direction.

Furthermore, an outer circumferential face of a core, which constitutes the core bobbin assembly abutting the support ring, may be provided with a mounting groove formed vertically, and a bottom of the terminal assembly may be provided with a plurality of catch pins, each of which is formed vertically and is for being inserted into the mounting groove to be held with the core bobbin assembly and the support ring together.

Here, an end of each catch pin may be provided with a buffer groove on an inner side thereof and a hook on an outer side thereof.

In addition, the support ring may be provided with an angled surface for easy insertion or release of the catch pin to a part where the mounting groove is formed.

Moreover, the synthetic resin may be formed of any one of a plastic resin or an epoxy resin.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Advantages, features, and methods for achieving these will be apparent by referring to embodiments described in detail below as well as the accompanying drawings. However, the present invention is not limited to embodiments described below but may be implemented in various different forms. The embodiments described make the present invention complete and are provided to let a person having ordinary skilled in the art fully understand the scope of the invention, and accordingly, the present invention is defined by what is set forth in the claims. On the other hand, the terms used herein are to describe various embodiments but not to limit the present invention. Singular forms herein may cover plural forms as well, unless otherwise explicitly mentioned. The terms "comprise" or "comprising" used herein are not intended to preclude the existence or addition of one or more further components, steps, operations, and/or elements, in addition to the components, steps, operations, and/or elements preceded by such terms.

Figure 1:
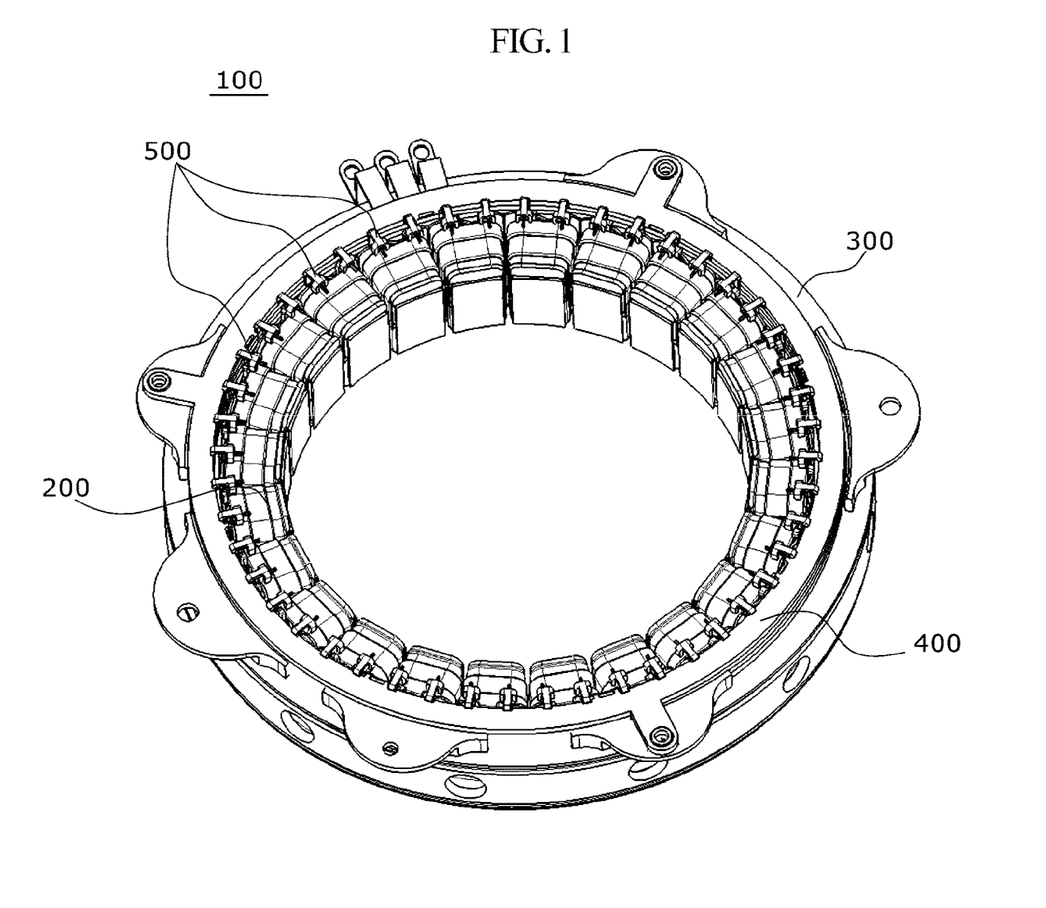
FIG. 1 is a perspective view of a terminal device for a drive motor of a vehicle according to the present invention.
Figure 2:
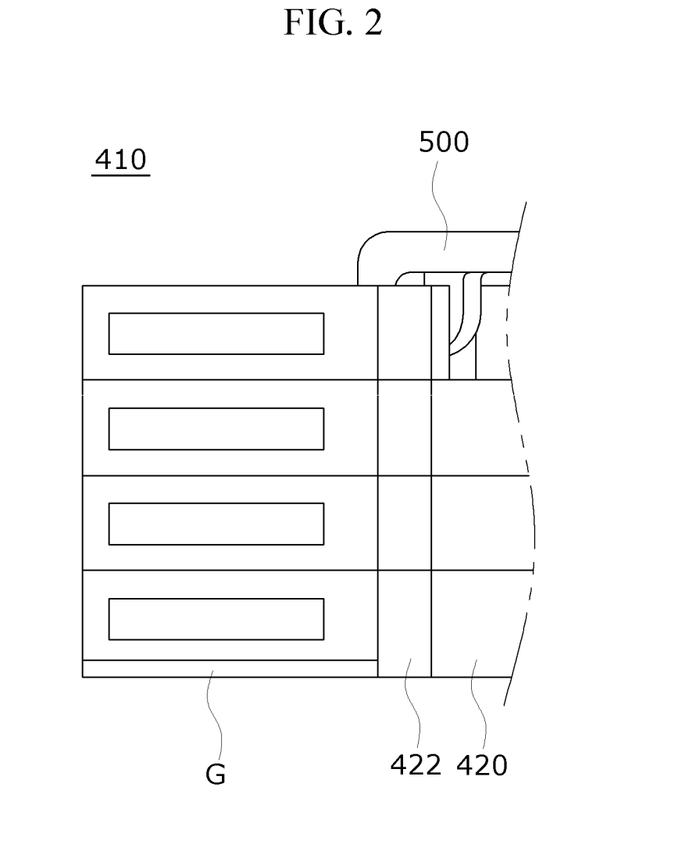
FIGS. 2 and 3 are sectional and bottom perspective views, respectively, of a terminal which constitutes a terminal device for a drive motor of a vehicle according to the present invention.
Figure 3:
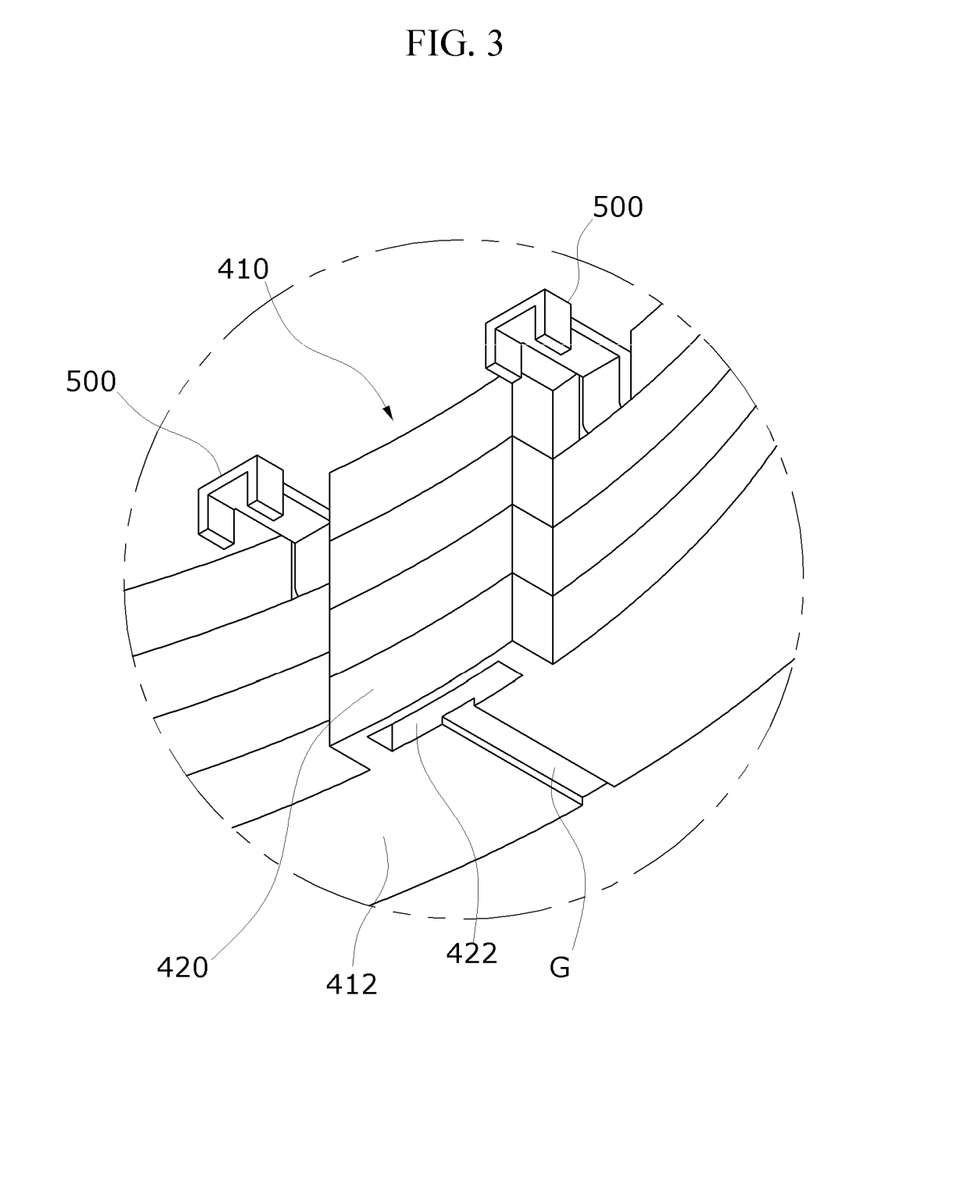
Figure 4:
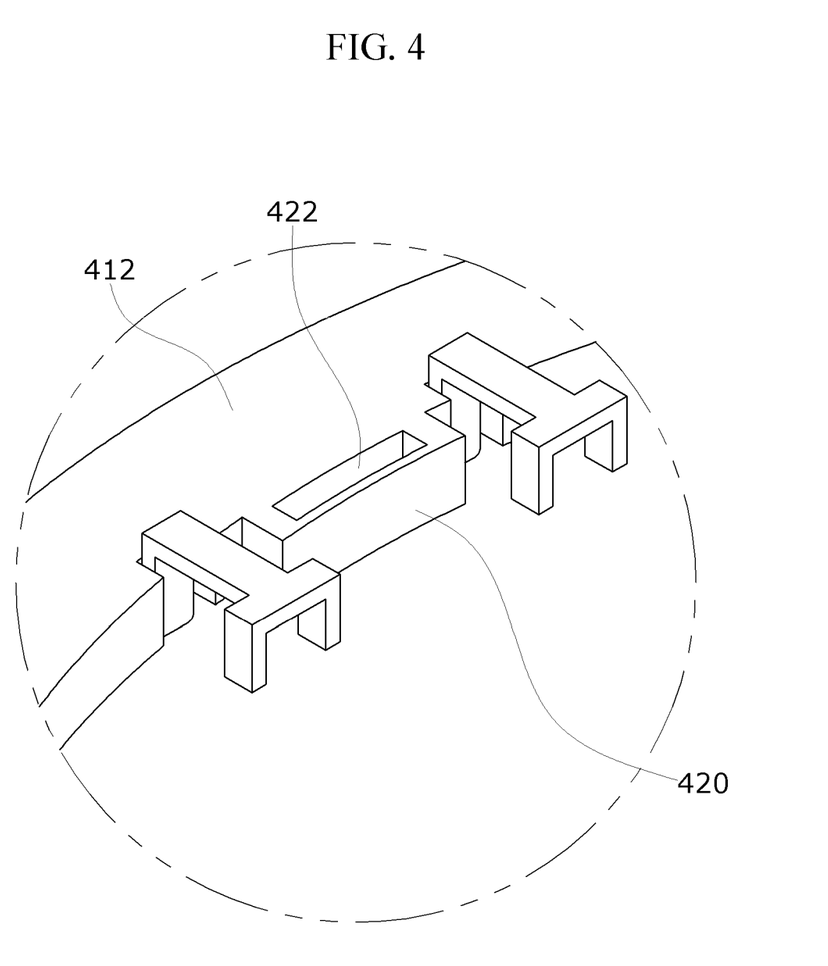
FIG. 4 is an enlarged view of a terminal member located at the top of a terminal which constitutes a terminal device for a drive motor of a vehicle according to the present invention.

Below, preferred embodiments of the present invention will be described in detail with reference to the accompanying drawings. FIG. 1 is a perspective view of a terminal device for a drive motor of a vehicle according to the present invention, FIGS. 2 and 3 are sectional and bottom perspective views, respectively, of a terminal which constitutes the terminal device for a drive motor of a vehicle according to the present invention, and FIG. 4 is an enlarged view of a terminal member located at the top of the terminal which constitutes the terminal device for a drive motor of a vehicle according to the present invention.

A terminal device 100 for a drive motor of a vehicle of the present invention comprises a core bobbin assembly 200, a support ring 300 for supporting the core bobbin assembly 200, and a terminal assembly 400 for being fitted with the support ring 300 and for fixing locking members 500.

Herein, the core bobbin assembly 200, the support ring 300, and the terminal assembly 400 constituting the terminal device 100 for a drive motor of a vehicle are not limited to what is shown in the drawings, and it should be understood that a core bobbin assembly, support ring, and terminal assembly known in the art may also be applicable to the present invention.

The terminal device 100 for a drive motor of a vehicle of the present invention will be described mainly based on what is different from the prior art.

In particular, the terminal device 100 for a drive motor of a vehicle is formed such that a terminal 410, which constitutes the terminal assembly 400, is provided with a plurality of resin injection holes 422 formed vertically and spaced apart from each other along the inner circumference thereof. The resin injection holes 422 are injected with a synthetic resin E, so as to hold the terminal assembly 400 and the core bobbin assembly together, as well as to improve durability thereof.

In other words, inside the terminal 410 of the terminal assembly 400 is formed with resin injection holes 422, into which a synthetic resin E is injected, so as to hold the terminal assembly 400 and the core bobbin assembly 200 together without any fastener.

In this case, the synthetic resin E may be formed of any one of plastic resins or epoxy resins, depending on environments, purposes, etc.

The terminal 410 which constitutes the terminal assembly 400 is formed in an annular shape with a hole at the center thereof, and the terminal 410 of the present invention is formed with a plurality of terminal members 412 in the shape of an annulus.

In other words, the terminal 410 is constructed in the shape of an annulus for easy assembly and disassembly, and is formed by stacking two or more terminal members 412 of the same diameter one on top of another.

In this case, the terminal 410 may be integrally formed with the plurality of terminal members 412 depending on environments, purposes, etc.

The terminal 410 constituting the terminal assembly 400 may be formed such that the bottom of the lowermost terminal member 412 of the terminal 410 is provided with resin flow passages G in the outward direction.

In this case, it may be effective if the resin flow passages G are formed to get wider in the outward direction.

In other words, the terminal 410 is formed with the resin flow passages G which get wider toward the outside, thereby enhancing the holding strength between the terminal assembly 400 and the core bobbin assembly 200.

Further, the resin injection holes 422 of the terminal assembly 400 may not only be formed inside the terminal 410, but also be formed vertically inside inward extensions 420 which protrude inward from the terminal 410 as shown in the drawings.

In other words, by forming the inward extensions 420, in which the resin injection holes 422 are formed respectively, spaced apart from each other in a predetermined interval along the inner circumference of the terminal 410 which constitutes the terminal assembly 400, it is possible for a user to visually check the injection locations for the synthetic resin E as well as to readily inject the synthetic resin E.

In this case, each of the resin injection hole 422 is formed inside each of the inward extensions 420 which is located farther inward from the inner circumference of the terminal 410 constituting the terminal assembly 400, so as to minimize the change in the shape and construction of an existing terminal 410 as well as to facilitate injection of the synthetic resin E.

Next, the terminal device 100 for a drive motor of a vehicle may be constructed as shown in FIGS. 6 to 11.

Figure 8:
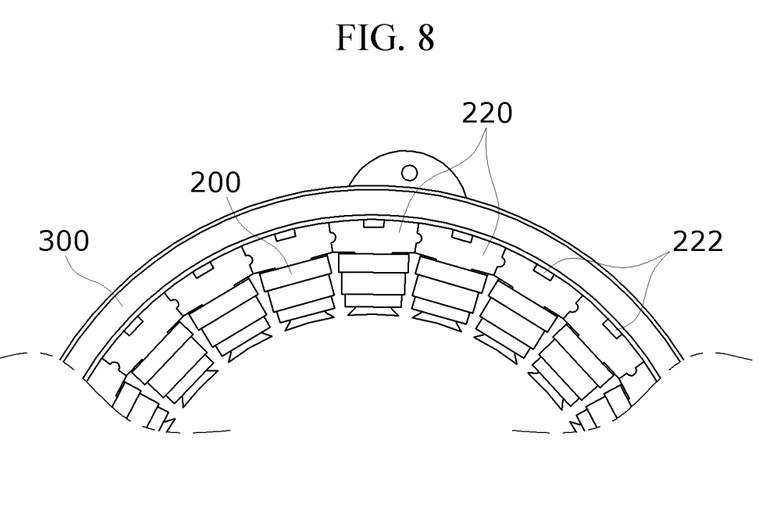
FIG. 8 is an enlarged plan view showing an assembled state of a core bobbin assembly and a support ring that constitute the terminal device for a drive motor of a vehicle shown in FIG. 6, according to the present invention.
Figure 9:
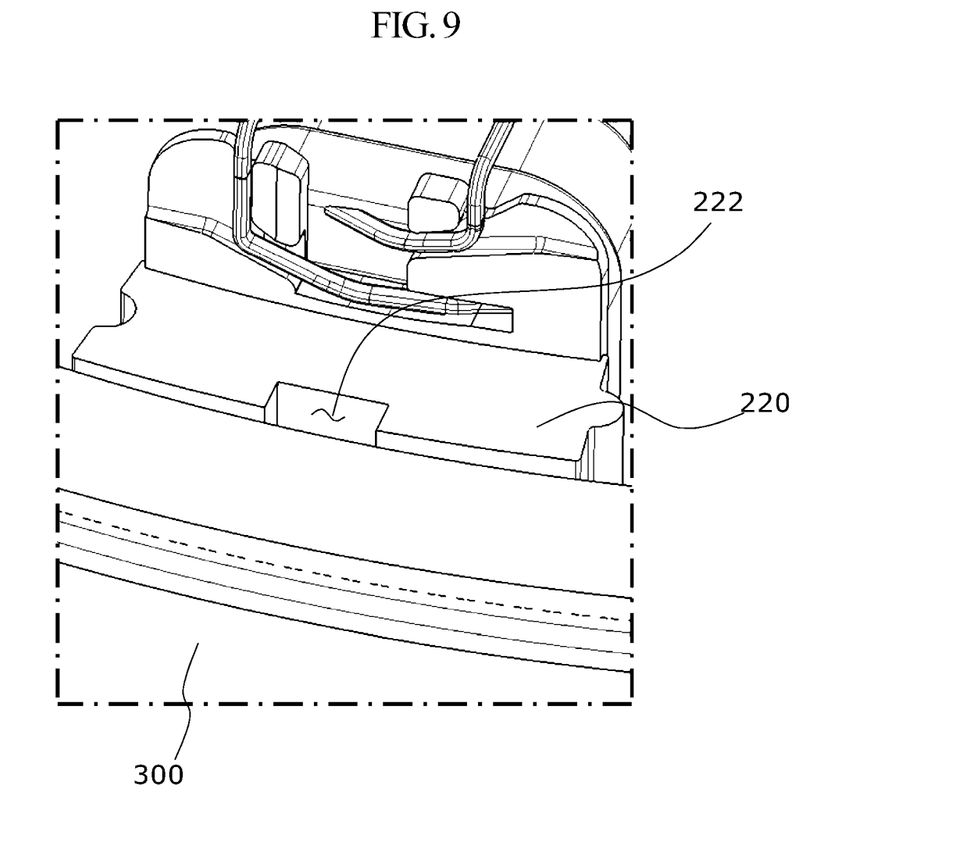
FIG. 9 is an enlarged view of a main part of FIG. 8, according to the present invention.
Figure 10:
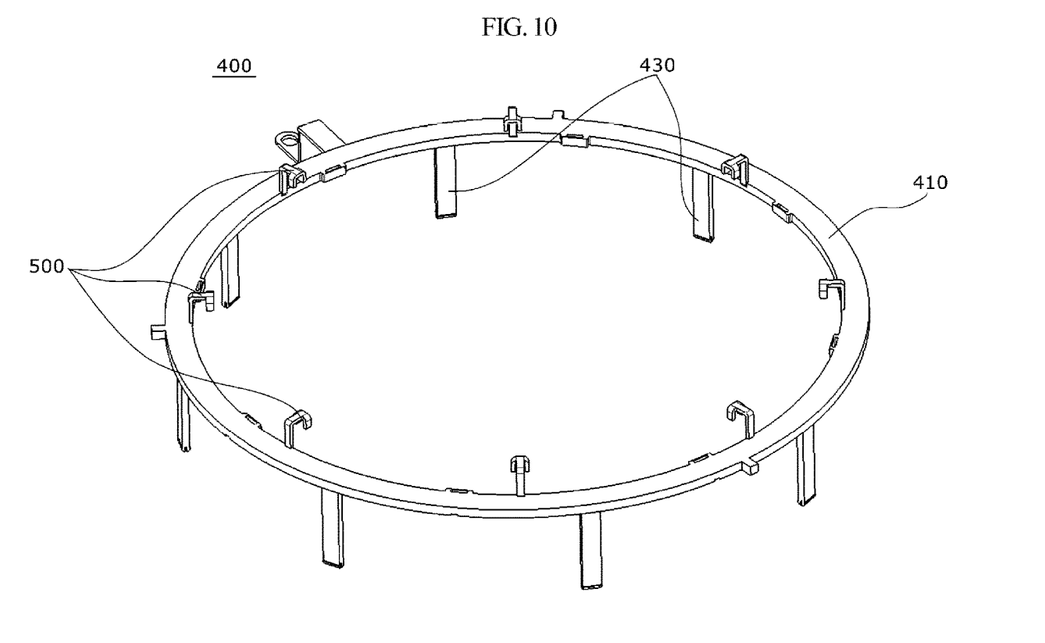
FIG. 10 is a perspective view showing another embodiment of a terminal assembly constituting a terminal device for a drive motor of a vehicle, according to the present invention.

First, the outer circumferential face of a core 220, which constitutes the core bobbin assembly 200 abutting the support ring 300, is provided with a mounting groove 222 formed vertically. Further, a plurality of catch pins 430 for being inserted into the mounting groove 222 are provided vertically at the bottom of the terminal assembly 400, to hold the core bobbin assembly 200 and the support ring 300 together.

In other words, the terminal device 100 for a drive motor of a vehicle is constructed such that the mounting groove 222 is formed on each of the cores 220 of the core bobbin assembly 200 at a location abutting the support ring 300, and catch pins 430 for being fitted into the mounting grooves 222 are formed at the bottom of the terminal assembly 400, so as to hold the core bobbin assembly 200 and the support ring 300 together when inserting the catch pin 430 into the mounting groove 222.

Figure 11:
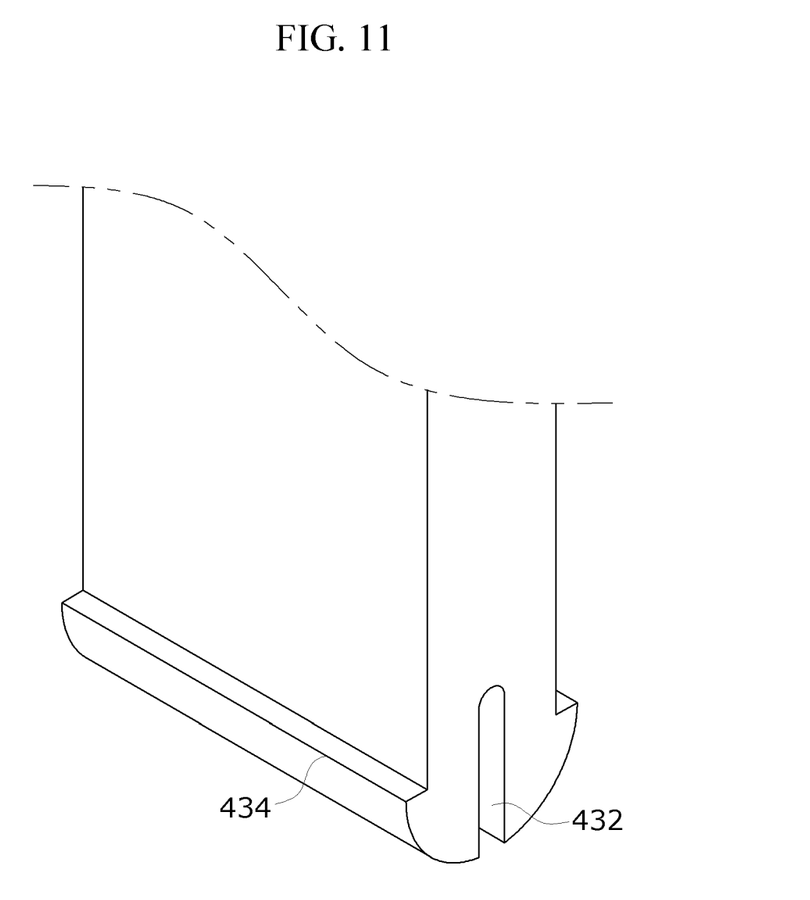
FIG. 11 is an enlarged view showing a catch pin of the terminal shown in FIG. 10, according to the present invention.

In this case, the end of the catch pin 430 is provided with a buffer groove 432 on the inner side thereof and a hook 434 on the outer side thereof, respectively, so as to hold the core bobbin assembly 200 and the support ring 300 together.

In a further description, when the catch pin 430 is inserted into the mounting groove 222 formed between the core 220 and the support ring 300, the hook 434 which is wider than the diameter of the mounting groove 222 elastically deforms to be compressed inward while sliding inside the mounting groove 222. When the hook 434 comes out of the mounting groove 222, it returns to its undeformed state to hold the core bobbin assembly 200 tightly.

Furthermore, the support ring 300 is provided with an angled surface for easy release of the catch pin 430 to the part where the mounting groove 222 of the core 220 is formed.

Now, an embodiment of the terminal device for a drive motor of a vehicle constructed as above will be described below.

First, a plurality of terminal members 412 in the shape of an annulus are prepared such that the inward extensions 420 inside of which is formed with the injection holes 422 are formed spaced apart from each other along the inner circumference of the terminal member 412, and three or four terminal members 412 are stacked one on top of another to form a terminal 410.

In this case, the terminal member 412 located at the bottom of the terminal 410 is provided with resin flow passages G which get wider in the outward direction.

Locking members 500 are provided spaced apart from each other along the inner circumference of the terminal member 412 located at the top of the terminal 410, to result in a terminal assembly 400.

Next, a core bobbin assembly 200 is formed by arranging cores having coils wound therearound along the circumferential direction, and then is placed inside the support ring 300 in the form of an annulus.

Figure 5:
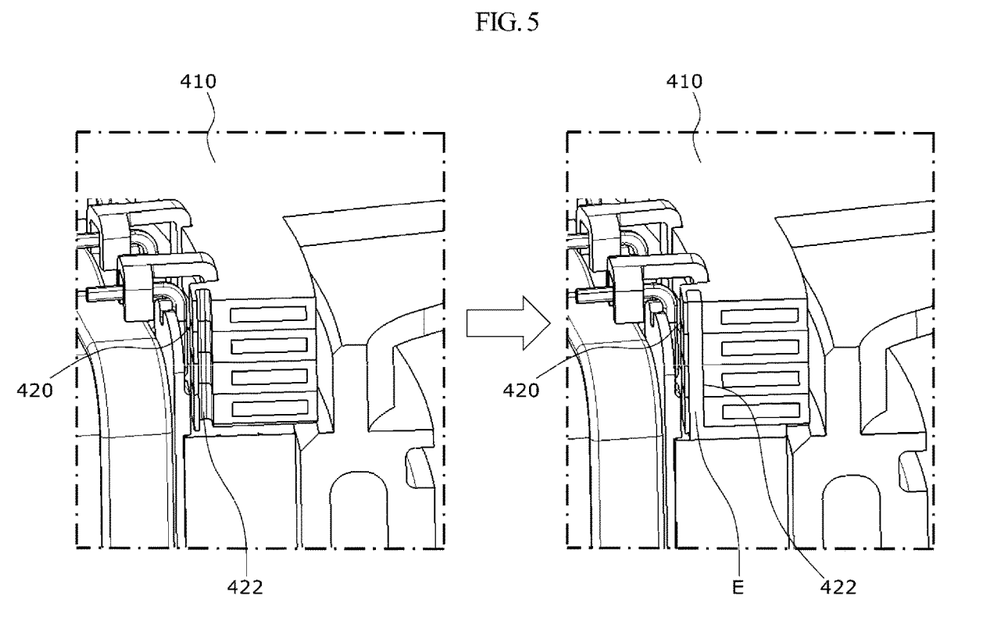
FIG. 5 illustrates a process of injecting an epoxy resin for constituting a terminal device for a drive motor of a vehicle according to the present invention.
Figure 6:
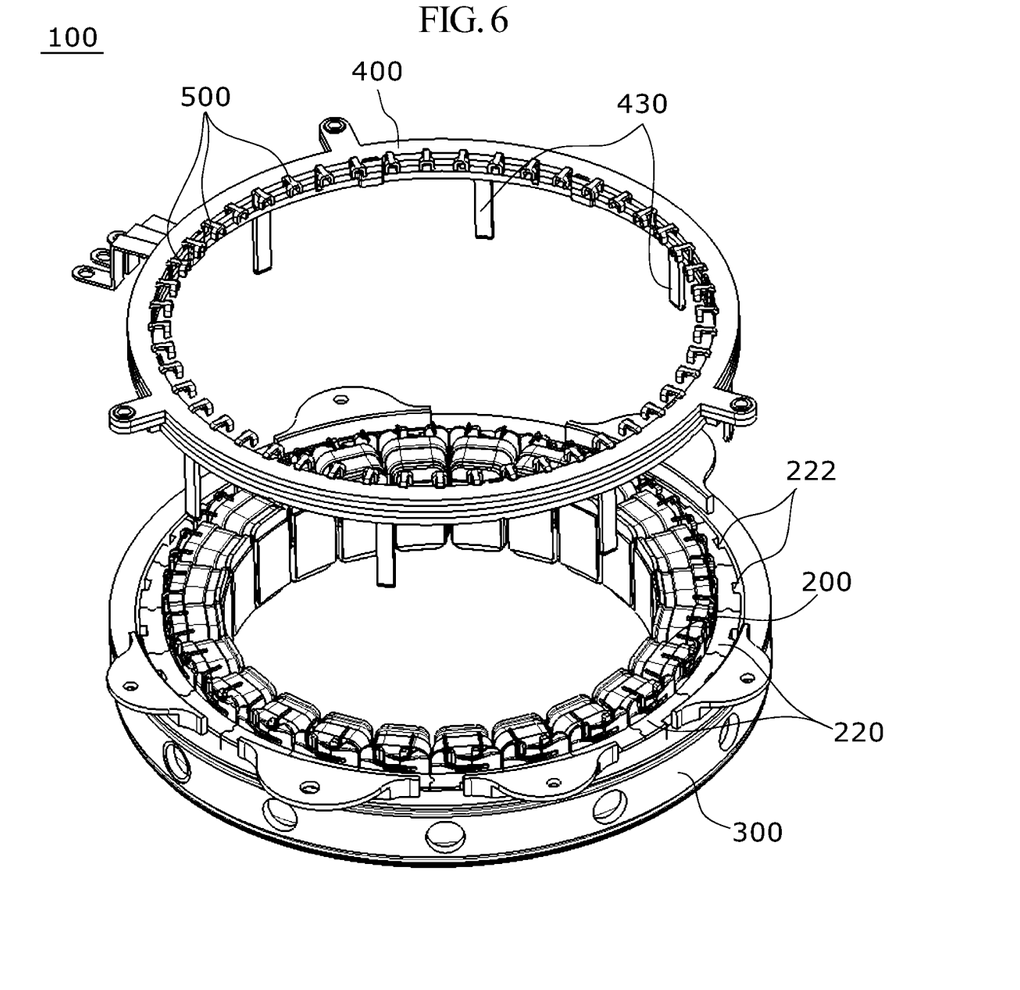
FIG. 6 shows another embodiment of a terminal device for a drive motor of a vehicle according to the present invention.
Figure 7:
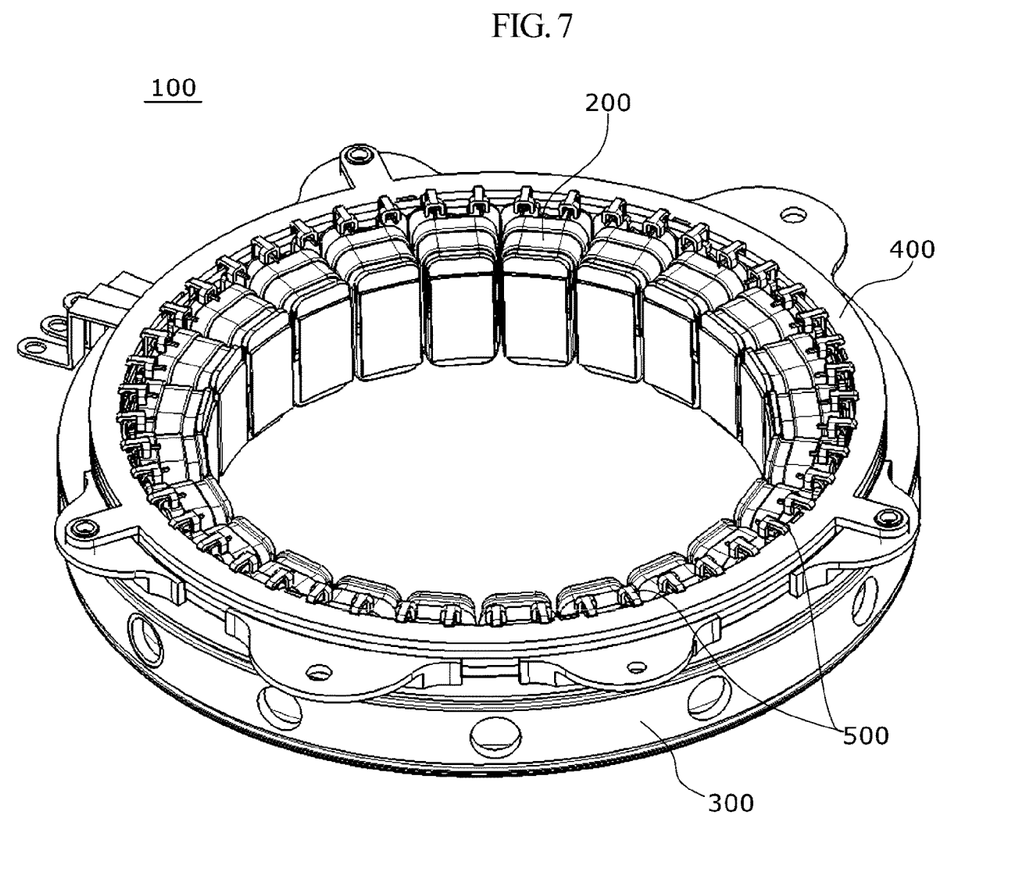
FIG. 7 is a perspective view of an assembled state of the terminal device for a drive motor of a vehicle shown in FIG. 6, according to the present invention.

The terminal assembly 400 is fitted onto the core bobbin assembly 200 and the support ring 300 from above, and then a synthetic resin E is injected into the resin injection holes 422 of the terminal 410.

Thereafter, the synthetic resin E, while flowing through the resin injection holes 422 and the resin flow passages G, bonds separate terminal members 412 together and also with the core 220 of the core bobbin assembly 200.

By injecting the synthetic resin E in the manner as describe above so that the core bobbin assembly 200 and the terminal assembly 400 may support each other, improvement in the holding strength and durability can be accomplished.

The above explained terminal device for a drive motor of a vehicle in accordance with the present invention provides effects of saving working hours by accomplishing cost reduction and durability as well as easy connection through modification of the structure of a terminal assembly and a core bobbin assembly.

The above description merely describes the spirit and principle of the present invention by way of examples, and a person having ordinary skill in the art may modify and change in various ways without departing from the essence of the present invention.

Therefore, the embodiments of the present invention are not intended to limit the spirit of the present invention, but to describe by way of examples, and accordingly, the scope of the claims of the present invention is not limited thereto. The scope of protection of the present invention is to be defined by the claims that follow, and all the spirit within what is equivalent or similar to the former should be construed to fall within the scope of claims of the present invention.

What is claimed is:

1. A terminal device for a drive motor of a vehicle, comprising:
   a core bobbin assembly having a core mounted in a circumferential direction, the core having a coil wound therearound;
   a support ring for supporting an outer part of the core bobbin assembly; and
   a terminal assembly fitted onto the support ring,
   wherein:
   a terminal for constituting the terminal assembly is provided with a resin injection hole formed vertically and along an inner circumference of the terminal; and
   the resin injection hole is fully enclosed and injected with a synthetic resin for holding the terminal assembly and the core bobbin assembly together.

2. The terminal device of claim 1, wherein the terminal assembly is provided with an inward extension on an inner face thereof, and the resin injection hole is formed inside the inward extension.

3. The terminal device of claim 1, wherein the terminal for constituting the terminal assembly is formed by combining a plurality of terminal members formed in a shape of an annulus.

4. The terminal device of claim 1, wherein a bottom of the terminal of the terminal assembly in which the resin injection hole is formed is provided with a resin flow passage to an outward direction.

5. The terminal device of claim 4, wherein the resin flow passage is configured to be wider through the outward direction.

6. The terminal device of claim 1,
   wherein an outer circumferential face of the core, which constitutes the core bobbin assembly abutting the support ring, is provided with a mounting groove formed vertically, and a bottom of the terminal assembly is provided with a catch pin, which is formed vertically and is inserted into the mounting groove to be held with the core bobbin assembly and the support ring together.

7. The terminal device of claim 6, wherein an end of the catch pin is provided with a buffer groove on an inner side of the catch pin and a hook on an outer side of the catch pin.

8. The terminal device of claim 6, wherein the support ring is provided with an angled surface for easy insertion or release of the catch pin to a part where the mounting groove is formed.

9. The terminal device of claim 1, wherein the synthetic resin is formed of any one of a plastic resin or an epoxy resin.

\* \* \* \* \*